United States Patent
Tai et al.

(10) Patent No.: US 11,289,958 B2
(45) Date of Patent: Mar. 29, 2022

(54) ROTOR LAMINATION AND ROTOR ASSEMBLY USING SAME

(71) Applicant: Delta Electronics, Inc., Taoyuan (TW)

(72) Inventors: Wei-Hsiu Tai, Taoyuan (TW); Chien-Chung Shih, Taoyuan (TW); Chia-Hsiang Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 181 days.

(21) Appl. No.: 16/592,209

(22) Filed: Oct. 3, 2019

(65) Prior Publication Data
US 2020/0412186 A1 Dec. 31, 2020

(30) Foreign Application Priority Data

Jun. 27, 2019 (CN) .......................... 201910567929.5

(51) Int. Cl.
*H02K 1/27* (2006.01)
*H02K 21/16* (2006.01)
(Continued)

(52) U.S. Cl.
CPC ............ *H02K 1/276* (2013.01); *H02K 21/16* (2013.01); *H02K 29/03* (2013.01); *H02K 2201/03* (2013.01); *H02K 2213/03* (2013.01)

(58) Field of Classification Search
CPC ...... H02K 1/276; H02K 1/2766; H02K 21/16; H02K 29/03; H02K 2201/03; H02K 2213/03
(Continued)

(56) References Cited

U.S. PATENT DOCUMENTS

2002/0171311 A1* 11/2002 Fujiwara ............... H02K 21/16
310/184
2009/0115279 A1* 5/2009 Spaggiari ............... H02K 1/276
310/156.53
(Continued)

FOREIGN PATENT DOCUMENTS

CN 203193413 U 9/2013
CN 105429410 B 6/2019
(Continued)

*Primary Examiner* — Maged M Almawri
*Assistant Examiner* — Eric Johnson
(74) *Attorney, Agent, or Firm* — Kirton McConkie; Evan R. Witt

(57) ABSTRACT

A rotor lamination for a motor having a motor air gap width value is disclosed. The rotor lamination includes a main-body portion, a plurality of edges and a plurality of magnet-receiving slots. The main-body portion is centered at a central axis of the motor. The edges are disposed around outside of the main-body portion. The magnet-receiving slots accommodate a plurality of magnets of the motor and locate around the central axis. The magnet-receiving slot has a slot width value in an outward direction extending from the central axis. The magnet-receiving slot and the corresponding edge form a magnet depth value. The magnet depth value is greater than a sum value of a first rate constant multiplied by the slot width value and then subtracted the motor air gap width value, and is less than the sum value of the first rate constant multiplied by the slot width value and then plus the motor air gap width value.

10 Claims, 11 Drawing Sheets

(51) Int. Cl.
*H02K 29/03* (2006.01)
*H02K 1/276* (2022.01)

(58) Field of Classification Search
USPC .................. 310/156.464, 156.53, 156.56
See application file for complete search history.

(56) References Cited

U.S. PATENT DOCUMENTS

| | | | | |
|---|---|---|---|---|
| 2012/0175989 | A1* | 7/2012 | Mathoy | ............... H02K 1/2766 |
| | | | | 310/156.53 |
| 2015/0372578 | A1* | 12/2015 | Matsuda | ............... H02K 1/276 |
| | | | | 310/156.07 |
| 2018/0358876 | A1 | 12/2018 | Fatemi et al. | |
| 2019/0173338 | A1* | 6/2019 | Zhu | ...................... H02K 1/278 |

FOREIGN PATENT DOCUMENTS

| | | |
|---|---|---|
| EP | 1734638 A1 | 12/2006 |
| EP | 1450470 B1 | 9/2012 |
| TW | 201325031 A | 6/2013 |
| WO | 2017/011682 A1 | 1/2017 |

* cited by examiner

ROTOR LAMINATION AND ROTOR ASSEMBLY USING SAME

FIELD OF THE INVENTION

The present disclosure relates to a rotor assembly applied to a motor, and more particularly to a rotor lamination and a rotor assembly using the same.

BACKGROUND OF THE INVENTION

Generally, a permanent magnet electric machine or a permanent magnetic motor includes a rotor and a stator. The stator includes a winding disposed thereon. The rotor includes a permanent magnet disposed thereon. The rotor is formed by stacking a plurality of rotor laminations, such as but not limited to, silicon steel sheets. In that, the rotor is rotated by the magnetic force generated between the stator and the rotor.

In order to improve the efficiency or performance of the motor, it is necessary to increase the torque ratio generated by a unit current. The value of the torque ratio is called as Torque Constant (KT), which is often used to evaluate the efficiency or performance of the motor. When the motor has a larger torque constant KT, only a lower current is required under the same torque demand, which can effectively reduce the copper wire loss and improve the efficiency.

Mostly, a flower-petal-shaped rotor design is exploited in a conventional permanent magnet motor, which has a plurality of slots disposed around the outer diameter of the rotor to organize the magnetic flux, so as to achieve the effects of improving the motor torque or reducing the cogging torque. However, in case of designing a flower-petal-shaped rotor, in order to ensure that the output torque performance (larger torque) can be maintained under an optimal torque ripple condition (smoother operation), it is necessary to balance the arc depth of the arc portion, the disposing position of the magnet and the size of the rib. When the simulation analysis software is utilized, due to a huge amount of variation factors, it takes a very long time to obtain the design value to balance the performance. Moreover, the dimensional parameters for the rotor are coupled with each other, and it results in increasing the difficulty of calculating the optimal size of the rotor.

Therefore, there is a need for providing a rotor lamination and a rotor assembly using the same to overcome the above drawbacks.

SUMMARY OF THE INVENTION

An object of the present disclosure is to provide a rotor lamination and a rotor assembly using the same. With a motor air gap width value and a slot width value of a magnet-receiving slot, a magnetic depth value formed between the magnet-receiving slot and the edge of the main body portion is designed, so as to minimize the torque ripple in the maximum output torque range. Thus, the endurance of anti-demagnetization of the output torque of motor is improved, and it achieves the effect of improving the efficiency of motor.

Another object of the present disclosure is to provide a rotor lamination and a rotor assembly using the same. With a motor air gap width value and a slot width value of a magnet-receiving slot, an arc depth value of an arc portion formed between two of the adjacent magnet-receiving slots and caved from the outer edge of the rotor toward the central axis of the rotor assembly is designed, so as to minimize the torque ripple in the maximum output torque range. Thus, the mutual influence of the leak flux of motor and the air-gap flux distribution/density is eliminated, and it achieves the effect of improving the efficiency of motor.

A further object of the present disclosure is to provide a rotor lamination and a rotor assembly using the same. With a motor air gap width value and a slot width value of a magnet-receiving slot, a first rib width value of a first rib formed between the magnet-receiving slot and an arc portion, and a second rib width value of a second rib formed between each two of the adjacent magnet-receiving slots are designed, so as to avoid the demagnetization of the magnet by the flux weakening control and reduce the leak flux caused by the rotor ribs effectively. It ensures the rotor assembly to provide the best output torque performance, thereby improving the efficiency of the motor.

A still further object of the present disclosure is to provide a rotor lamination and a rotor assembly using the same. By optimizing the size and parameters, it simplifies the design and speeds up the development of products.

In accordance with an aspect of the present disclosure, a rotor lamination is disclosed. The rotor lamination is applied to a motor. The motor has a motor air gap width value. The rotor lamination includes a main-body portion, a plurality of edges and a plurality of magnet-receiving slots. The rotor lamination includes a main-body portion, a plurality of edges and a plurality of magnet-receiving slots. The main-body portion has a center configured to be spatially corresponding to and located at a central axis of the motor. The plurality of edges are disposed around outside of the main-body portion. The plurality of magnet-receiving slots are configured to accommodate a plurality of magnets of the motor therein, and disposed on the main-body portion around the central axis. Each of the plurality of magnet-receiving slots accommodates the magnet corresponding thereto. The magnet-receiving slot has a slot width value in an outward direction extending from the central axis. The magnet-receiving slot and the corresponding edge at outside of the main-body portion form a magnet depth value. The magnet depth value is greater than a sum value of a first rate constant multiplied by the slot width value and then subtracted the motor air gap width value, and is less than the sum value of the first rate constant multiplied by the slot width value and then plus the motor air gap width value.

In accordance with another aspect of the present disclosure, a rotor assembly is provided. The rotor assembly is applied to a motor. The motor has a motor air gap width value. The rotor assembly includes a plurality of magnets, and a plurality of rotor laminations. The plurality of rotor laminations are stacked along a central axis of the motor. Each of the plurality of rotor laminations includes a main-body portion, a plurality of edges and a plurality of magnet-receiving slots. The main-body portion has a center spatially corresponding to and located at the central axis. The plurality of edges are disposed around outside of the main-body portion. The plurality of magnet-receiving slots are configured to accommodate the plurality of magnets, and disposed on the main-body portion around the central axis. Each of the plurality of magnet-receiving slot has a slot width value in an outward direction extending from the central axis. The magnet-receiving slot and the corresponding edge at outside of the main-body portion form a magnet depth value. The magnet depth value is greater than a sum value of a first rate constant multiplied by the slot width value and then subtracted the motor air gap width value, and is less than the sum value of the first rate constant multiplied by the slot width value and then plus the motor air gap width value.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
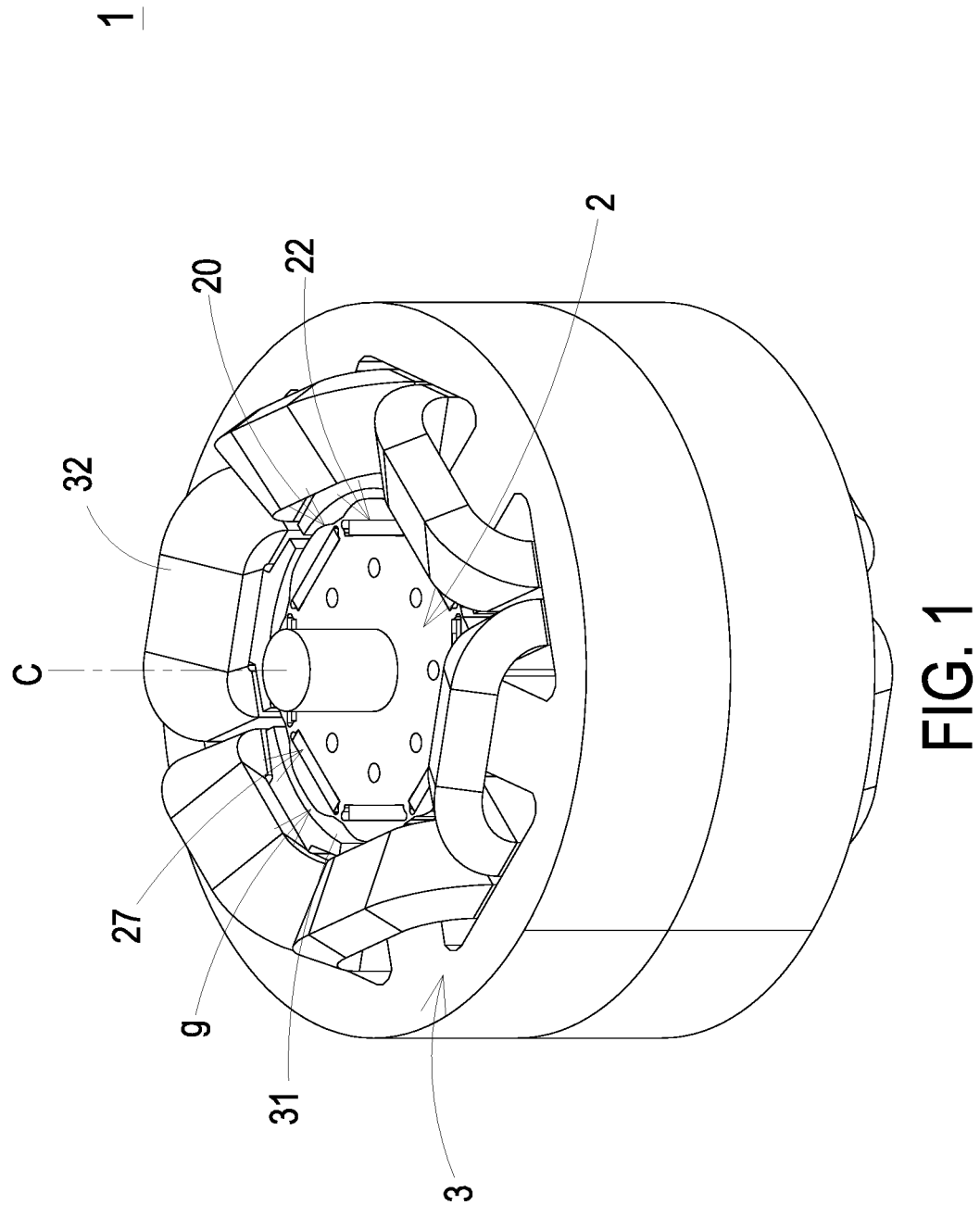
FIG. 1 is a perspective structural view illustrating a motor according to a preferred embodiment of the present disclosure.
Figure 2:
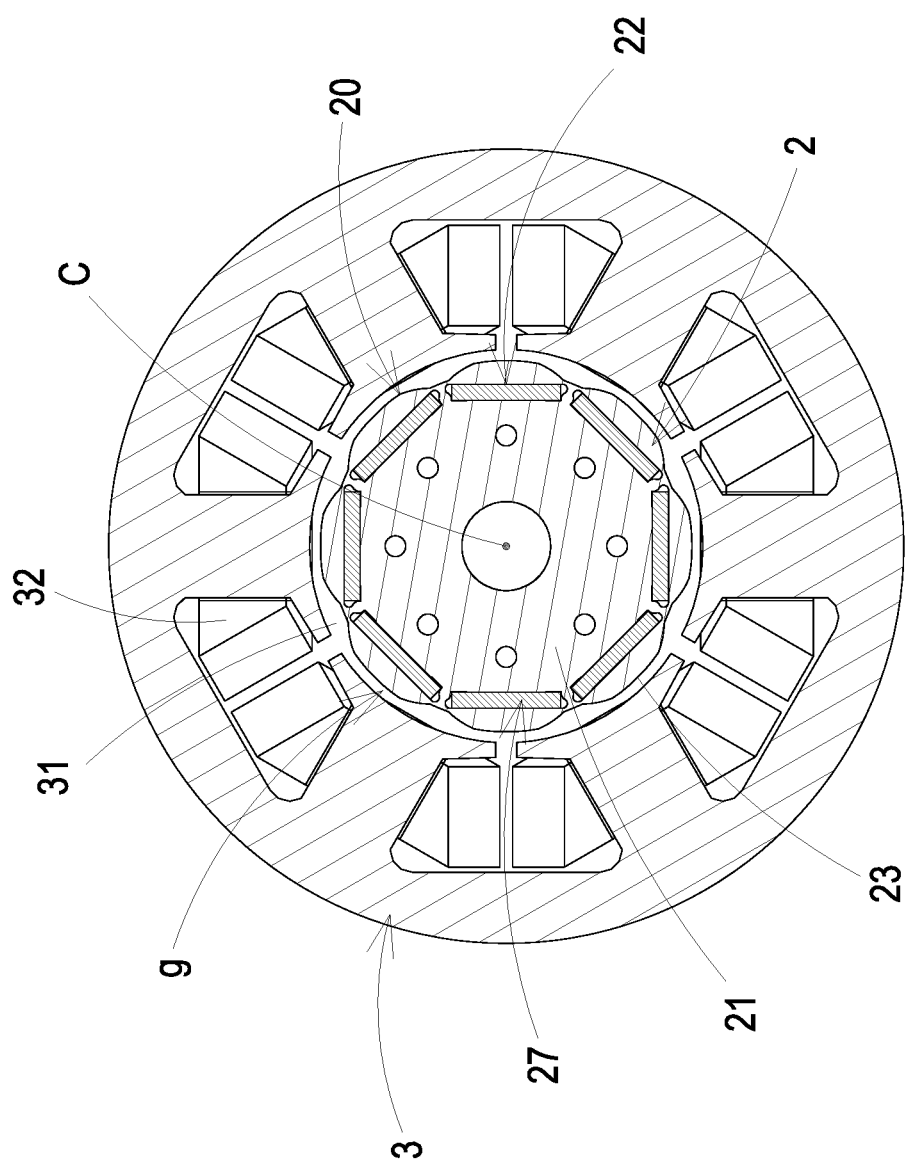
FIG. 2 is a planar sectional view illustrating the motor of FIG. 1.
Figure 3:
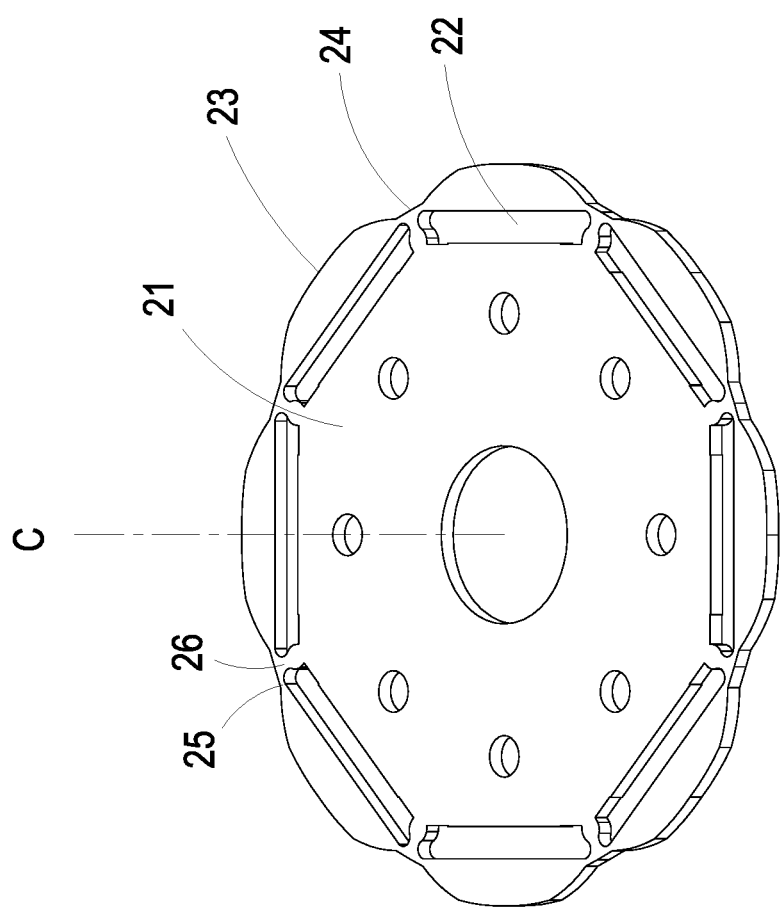
FIG. 3 is a perspective structural view illustrating a rotor lamination according to a preferred embodiment of the present disclosure.
Figure 4:
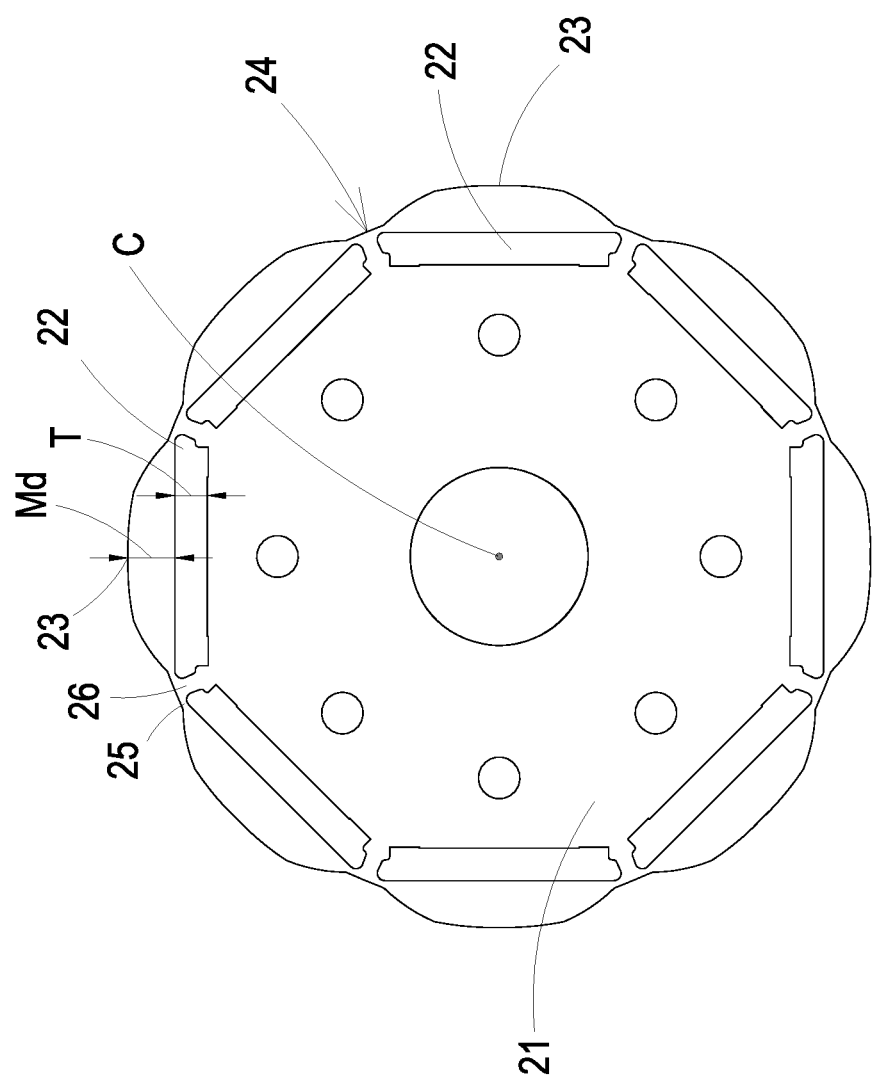
FIG. 4 is a top view illustrating the rotor lamination according to the preferred embodiment of the present disclosure.
Figure 5:
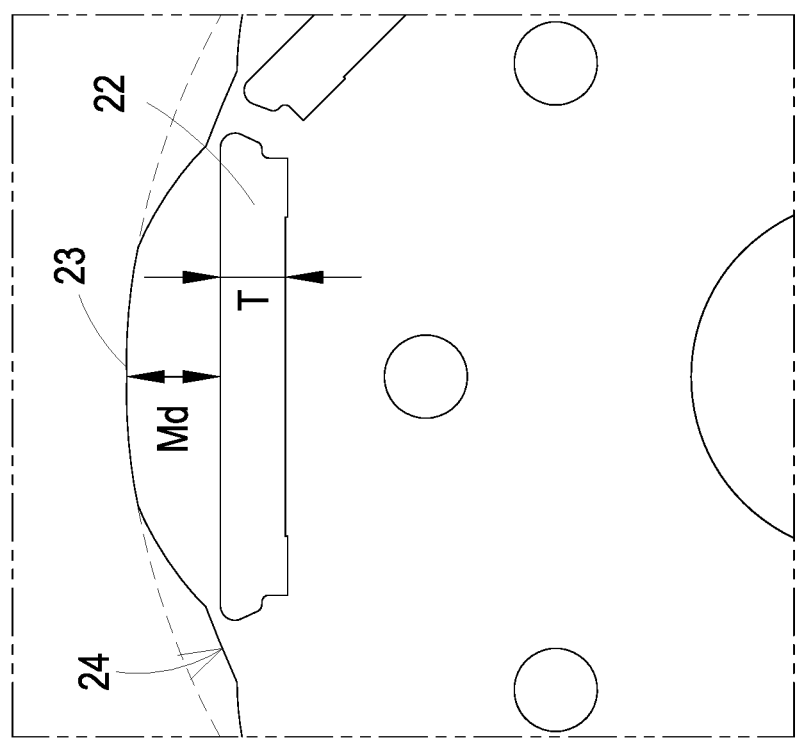
FIG. 5 is a partial enlarged view illustrating the rotor lamination according to the preferred embodiment of the present disclosure.

Please refer to FIGS. 1 to 5. FIG. 1 is a perspective structural view illustrating a motor according to a preferred embodiment of the present disclosure. FIG. 2 is a planar sectional view illustrating the motor of FIG. 1. FIG. 3 is a perspective structural view illustrating a rotor lamination according to a preferred embodiment of the present disclosure. FIG. 4 is a top view illustrating the rotor lamination according to the preferred embodiment of the present disclosure. FIG. 5 is a partial enlarged view illustrating the rotor lamination according to the preferred embodiment of the present disclosure. In the embodiment, the motor 1 includes at least a rotor assembly 2 and a stator assembly 3. Preferably but not exclusively, the combination of the rotor assembly 2 and the stator assembly 3 is implemented by means of an outer stator and an inner rotor. The present disclosure is not limited thereto. In the embodiment, the stator assembly 3 includes a hollow portion 31 and a plurality of windings 32 disposed correspondingly on a plurality of teeth of the stator assembly 3. The rotor assembly 2 is received within the hollow portion 31 of the stator assembly 3. In the embodiment, the rotor assembly 2 and the stator assembly 3 of the motor 1 are assembled to form a motor air gap width value g therebetween. Preferably but not exclusively, the motor air gap width value g is ranged from 0.25 mm to 1.0 mm. The present disclosure is not limited thereto. In the embodiment, the rotor assembly 2 includes a plurality of magnets 27 and a plurality of rotor laminations 20. The plurality of rotor laminations 20 can be made of, for example but not limited to, a silicon steel material sheet. The plurality of rotor laminations 20 are stacked to each other along a central axis C of the motor 1. The central axis C is constructed as the rotary center of the rotor assembly 2, and the rotor assembly 2 is substantially rotated about the central axis C. Furthermore, the central axis C can be regarded as the symmetric center of the motor 1. Moreover, in the embodiment, the number, the spaced distance and one-piece thickness of rotor laminations 20 are adjustable according to the practical requirements. In the embodiment, each of the rotor laminations 20 includes a main-body portion 21, a plurality of edges 23 and a plurality of magnet-receiving slots 22. The main-body portion 21 has a center spatially corresponding to and located at the central axis C of the motor 1. The plurality of edges 23 are disposed surrounding outside of the main-body portion 21. The plurality of magnet-receiving slots 22 are symmetrically disposed on the main-body portion 21 and around the central axis C, and pass through the main-body portion 21. The plurality of rotor laminations 20 are stacked to each other along the central axis C, and the plurality of magnet-receiving slots 22 are configured to spatially correspond to and accommodate the plurality of magnets 27. In detail, the plurality of magnet-receiving slots 22 are corresponding to and accommodate the plurality of magnets 27 therein, respectively. Preferably but not exclusively, the magnets 27 are the bar-shaped permanent magnets. In the embodiment, the number of the magnet-receiving slots 22 is relative to the number of the magnets 27. Namely, the numbers of both are the same. For example, there are eight magnet-receiving slots 22 and eight magnets 27 correspondingly accommodated therein. Each of the plurality of magnet-receiving slots 22 accommodates the magnet 27 corresponding thereto. In that, the eight magnet-receiving slots 22 and the eight magnets 27 corresponding thereto are paired one-to-one, and disposed symmetrically around the central axis C at a central angle of about every 45 degrees. The present disclosure is not limited thereto. In other embodiments, the numbers of the magnet-receiving slot 22 and the magnets 27 can be, for example but not limited to, six, ten or twelve. In other words, the number of the magnet-receiving slots 22 and the number of the magnets 27 in the present disclosure can be expressed as 2N, wherein N is an integer and N is greater than or equal to 3. Thus, the rotor assembly 2 can be designed to provide 2N poles, which will not be redundantly described hereafter. In addition, the magnet-receiving slots 22 can also accommodate the magnets 27 in one-to-many manner, but is not limited thereto.

Notably, as shown in FIGS. 4 and 5, the magnet-receiving slot 22 has a slot width value T in an outward direction extending from the central axis C toward outside of the rotor assembly 2 (or toward the edges 23 disposed around outside of the main-body portion 21) In the embodiment, the slot width value T is equal to or slightly greater than the thickness of the magnet 27, so that the magnet 27 is stably embedded in the corresponding magnet-receiving slot 22 without being detached. Preferably but not exclusively, the slot width value T is less than 15 times of the motor air gap width value g, but the present disclosure is not limited thereto. In the embodiment, the plurality of edges 23 are disposed adjacent to each other, and disposed around the main-body portion 21. Namely, the plurality of edges 23 are disposed around outside of the main-body portion 21. In addition, the magnet-receiving slot 22 and the corresponding edge 23 at outside of the main-body portion 21 form a magnet depth value Md. In the embodiment, the magnet depth value Md is greater than the sum value of a first rate constant K1 multiplied by the slot width value T and then subtracted the motor air gap width value g, and is less than the sum value of the first rate constant K1 multiplied by the slot width value T and then plus the motor air gap width value g. The relationships of the magnet depth value Md, the first rate constant K1, the slot width value T and the motor air gap width value g can be expressed as the following equation (1).

$$K1 \times T - 1 \times g < Md < K1 \times T + 1 \times g \qquad (1)$$

In the embodiment, the first rate constant K1 is ranged from 1.4 to 1.5. Table 1 shows the relationships of the output torques and torque ripples relative to different magnet depth values.

TABLE 1

| Magnet depth value Md | Output torque [N · M] | Torque ripple [%] |
|---|---|---|
| K1 × T-2 g | 28.6 | 1.7 |
| K1 × T-1.5 g | 29.19 | 1.65 |
| K1 × T-1 g | 29.99 | 1.6 |
| K1 × T-0.5 g | 31.01 | 1.55 |
| K1 × T + 0 g | 31.89 | 1.7 |
| K1 × T + 0.5 g | 31.47 | 1.85 |
| K1 × T + 1 g | 31.16 | 2.12 |
| K1 × T + 1.5 g | 30.38 | 1.73 |
| K1 × T + 2 g | 29.81 | 1.56 |

Figure 6:
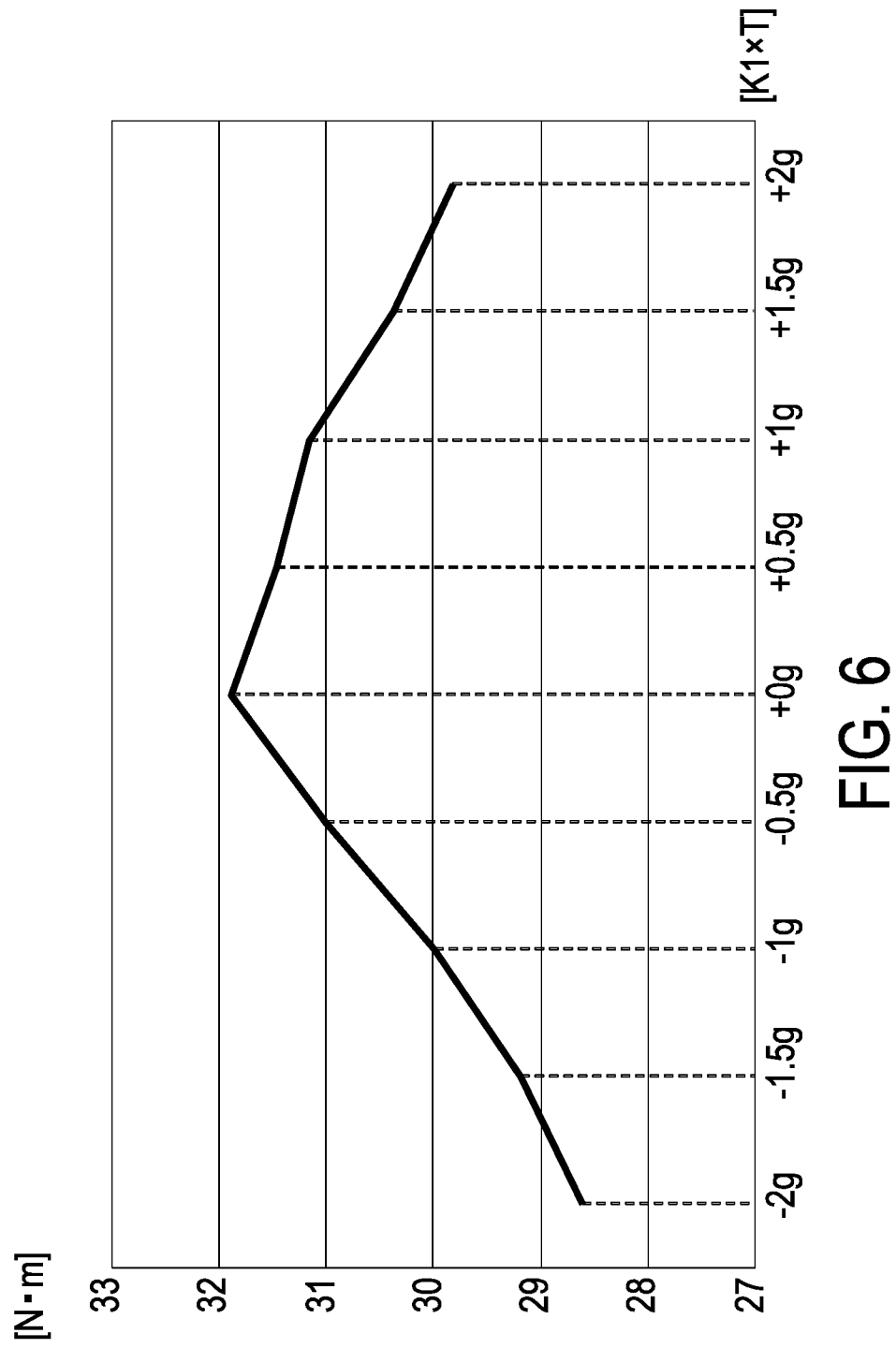
FIG. 6 shows the relationships of output torques relative to different magnet depth values.
Figure 7:
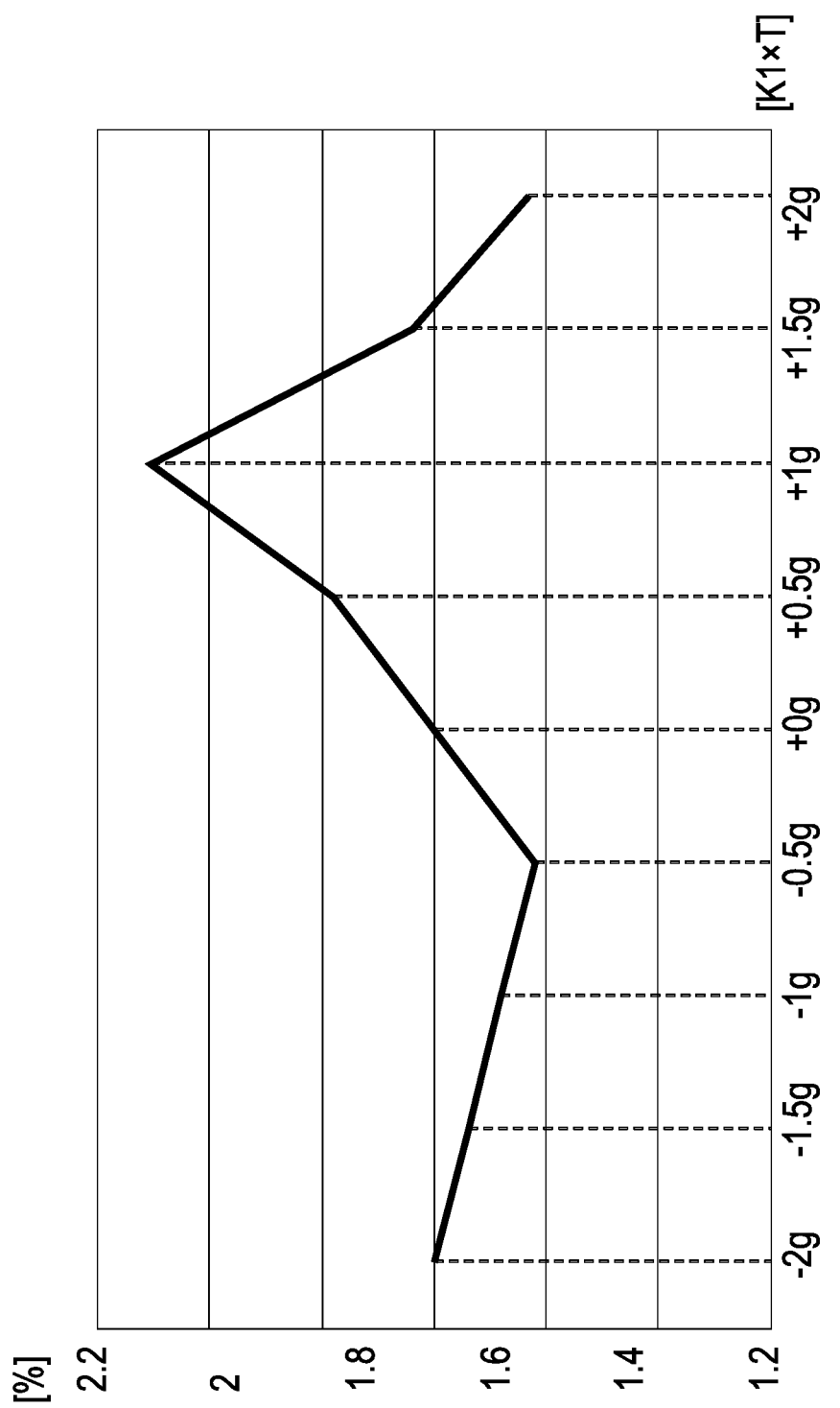
FIG. 7 shows the relationships of torque ripples relative to different magnet depth values.

FIG. 6 shows the relationships of output torques relative to different magnet depth values. FIG. 7 shows the relationships of torque ripples relative to different magnet depth values As shown in FIGS. 6 and 7, while the rotor lamination 20 has the magnet depth value Md designed in the range of equation (1), it tends to obtain and compromise a maximum output torque and a minimum torque ripple. Namely, as the magnet depth value Md is greater than the sum value of the first rate constant K1 multiplied by the slot width value T and then subtracted the motor air gap width value g, and is less than the sum value of the first rate constant K1 multiplied by the slot width value T and then plus the motor air gap width value g, it benefits to minimize the torque ripple in the maximum output torque range. Thus, the endurance of anti-demagnetization of the output torque of motor is improved, and it achieves the effect of improving the efficiency of motor.

Figure 8:
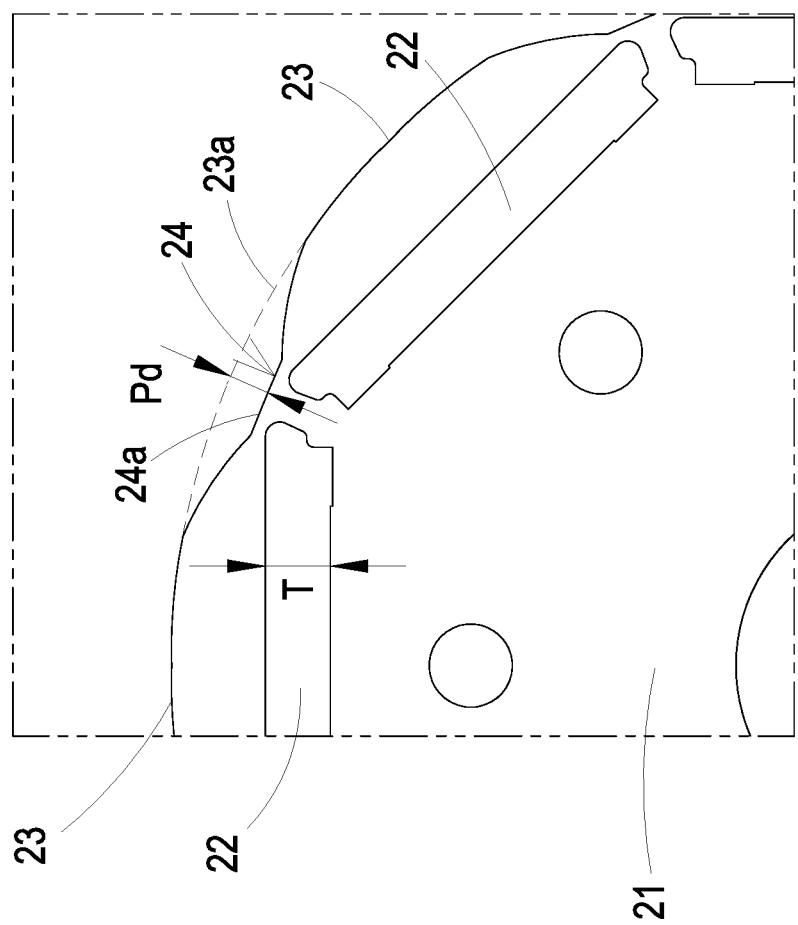
FIG. 8 is another partial enlarged view illustrating the rotor lamination according to the preferred embodiment of the present disclosure.

Furthermore, refer to FIGS. 1 to 5 and FIG. 8. FIG. 8 is another partial enlarged view illustrating the rotor lamination according to the preferred embodiment of the present disclosure. In the embodiment, an outer edge 23a is formed between each two of the adjacent edges 23 correspondingly. The rotor lamination 20 further includes a plurality of arc portions 24, and each of the plurality of arc portions 24 is disposed between each two of the adjacent magnet-receiving slots 22, respectively. Namely, each of the plurality of arc portions 24 is located between each two of the adjacent edges 23. The arc portions 24 are caved from the outer edges 23a at outside of the main-body portion 21 toward the central axis C, so as to have an arc depth value Pd, which is formed between the outer edge 23a and a bottom 24a of the arc portions 24 corresponding thereto. In the embodiment, the arc depth value Pd is greater than the sum value of a second rate constant K2 multiplied by the slot width value T and then subtracted the motor air gap width value g, and is less than the sum value of the second rate constant K2 multiplied by the slot width value T and then plus the motor air gap width value g. The relationships of the arc depth value Pd, the second rate constant K2, the slot width value T and the motor air gap width value g can be expressed as the following equation (2).

$$K2 \times T - 1 \times g < Pd < K2 \times T + 1 \times g \qquad (2)$$

In the embodiment, the second rate constant K2 is ranged from 0.5 to 0.6. Table 2 shows the relationships of the output torques and torque ripples relative to different arc depth values.

TABLE 2

| Arc depth value Pd | Output torque [N · M] | Torque ripple [%] |
|---|---|---|
| K2 × T-2 g | 29.4 | 2.21 |
| K2 × T-1.5 g | 30.65 | 2.14 |
| K2 × T-1 g | 31.78 | 2.05 |
| K2 × T-0.5 g | 32.63 | 1.85 |
| K2 × T + 0 g | 31.89 | 1.7 |
| K2 × T + 0.5 g | 30.98 | 1.85 |
| K2 × T + 1 g | 30.28 | 2.03 |
| K2 × T + 1.5 g | 28.8 | 1.73 |
| K2 × T + 2 g | 27.5 | 1.65 |

Figure 9:
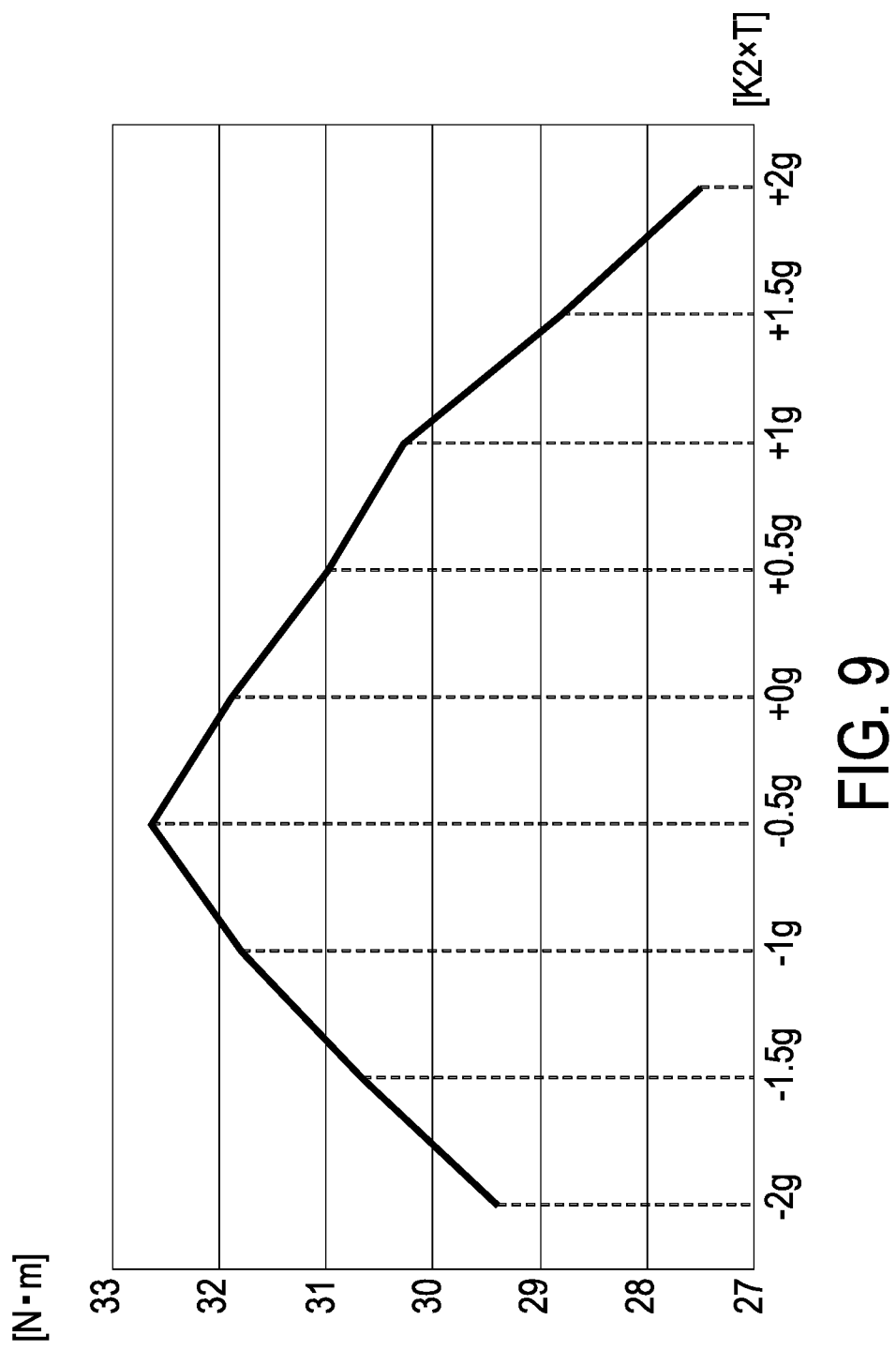
FIG. 9 shows the relationships of output torques relative to different arc depth values.
Figure 10:
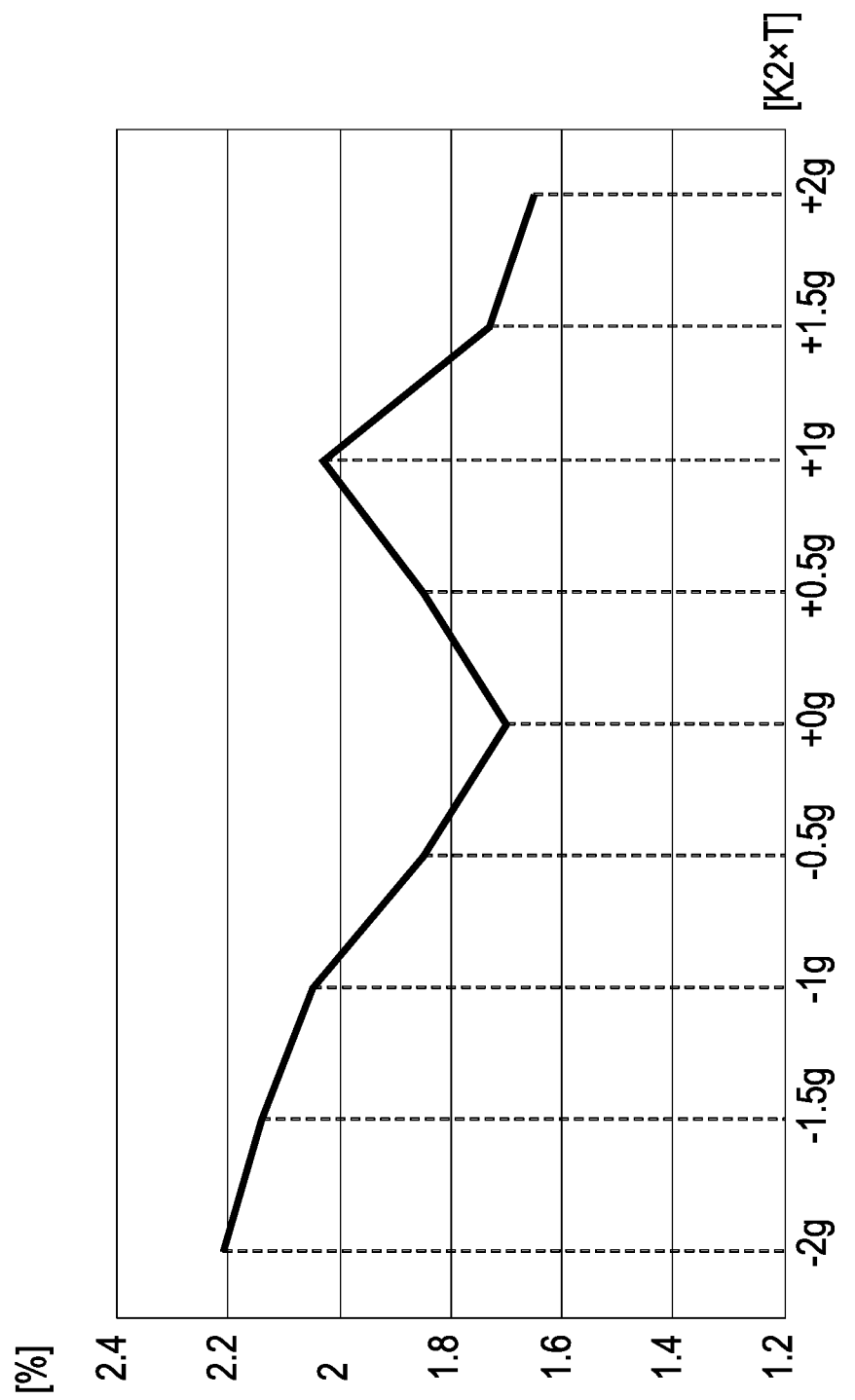
FIG. 10 shows the relationships of torque ripples relative to different arc depth values.

FIG. 9 shows the relationships of different arc depth values and output torques. FIG. 10 shows the relationships of different arc depth values and torque ripples. As shown in FIGS. 9 and 10, while the rotor lamination 20 has the arc depth value Pd designed in the range of equation (2), it tends to obtain and compromise a maximum output torque and a minimum torque ripple. Namely, as the arc depth value Pd is greater than the sum value of the second rate constant K2 multiplied by the slot width value T and then subtracted the motor air gap width value g, and is less than the sum value of the second rate constant K2 multiplied by the slot width value T and then plus the motor air gap width value g, it benefits to minimize the torque ripple in the maximum output torque range. Thus, the mutual influence of the leak flux of motor and the air-gap flux distribution/density is eliminated, and it achieves the effect of improving the efficiency of motor.

Figure 11:
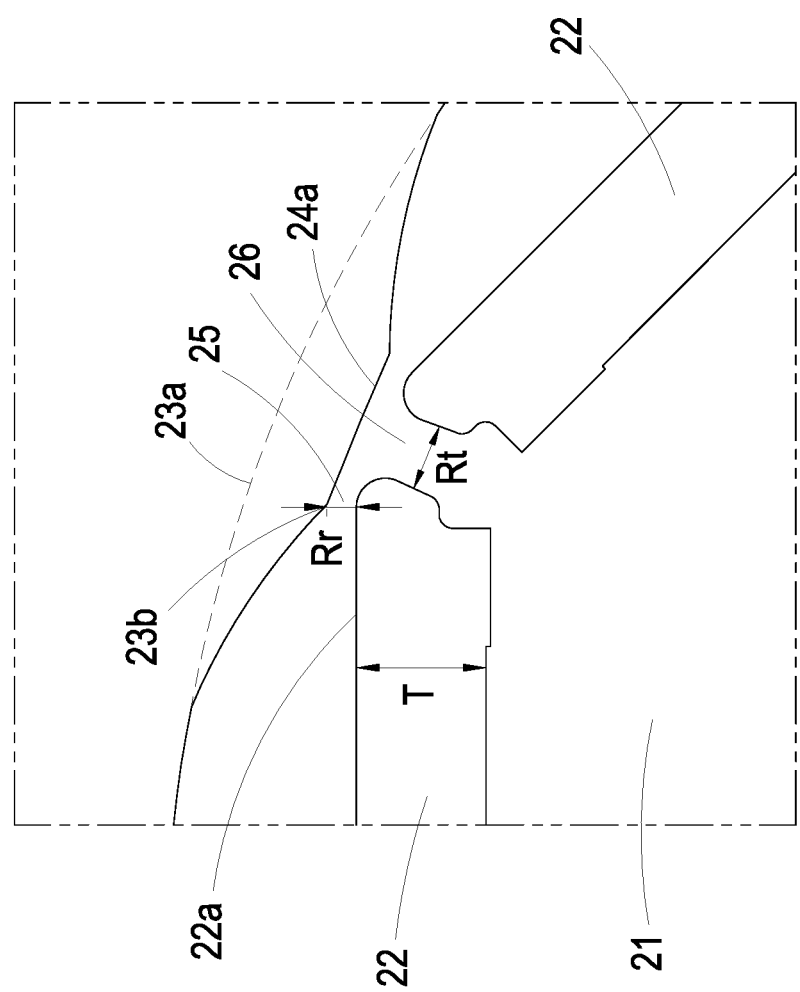
FIG. 11 is a further partial enlarged view illustrating the rotor lamination according to the preferred embodiment of the present disclosure.

Furthermore, refer to FIGS. 1 to 5, FIG. 8 and FIG. 11. FIG. 11 is a further partial enlarged view illustrating the rotor lamination according to the preferred embodiment of the present disclosure. In the embodiment, the rotor lamination 20 further includes a plurality of first ribs 25 disposed between each of the plurality of magnet-receiving slots 22 and each of the plurality of arc portions 24 corresponding thereto, respectively. Each of the plurality of first ribs 25 has a first rib width value Rr, which is formed between a boundary 23b of the bottom 24a of the arc portion 24 and an edge 22a of the magnet-receiving slot 22 corresponding thereto. In the embodiment, the first rib width value Rr is greater than the sum value of the slot width value T divided by the sum of the slot width value T and the motor air gap width value g and then subtracted 0.5 times of the motor air gap width value g, and is less than the sum value of the slot width value T divided by the sum of the slot width value T and the motor air gap width value g and then plus 0.25 times of the motor air gap width value g. The above relationships of the first rib width value Rr, the slot width value T and the motor air gap width value g can be expressed as the following equation (3).

$$T/(g+T) - 0.5 \times g < Rr < T/(g+T) + 0.25 \times g \qquad (3)$$

In addition, the rotor lamination 20 further includes a plurality of second ribs 26 formed between the adjacent magnet-receiving slots 22, respectively. Each of the plurality of second ribs 26 has a second rib width value Rt. In the embodiment, the second rib width value Rt is greater than the sum value of the slot width value T divided by the sum of the slot width value T and the motor air gap width value g and then plus 0.25 times of the motor air gap width value g, and is less than the sum value of the slot width value T divided by the sum of the slot width value T and the motor air gap width value g and then plus 1.25 times of the motor air gap width value g. The above relationships of the second rib width value Rt, the slot width value T and the motor air gap width value g can be expressed as the following equation (4).

$$T/(g+T)+0.25 \times g < Rt < T/(g+T)+1.25 \times g \qquad (4)$$

Thus, the first rib width value Rr of the first rib 25 disposed between the corresponding magnet-receiving slot 22 and an arc portion 24, and the second rib width value Rt of the second rib 26 disposed between the corresponding two magnet-receiving slots 22 are designed, so as to avoid the demagnetization of the magnet by the flux weakening control and reduce the leak flux caused by the rotor ribs effectively. It ensures the rotor assembly 2 to provide the best output torque performance, thereby improving the efficiency of the motor.

In summary, the present disclosure provides a rotor lamination and a rotor assembly using the same. With a motor air gap width value and a slot width value of a magnet-receiving slot, a magnetic depth value formed between the magnet-receiving slot and an edge of the main body portion is designed, so as to minimize the torque ripple in the maximum output torque range. Thus, the endurance of anti-demagnetization of the output torque of motor is improved, and it achieves the effect of improving the efficiency of motor. Moreover, with the motor air gap width value and the slot width value of the magnet-receiving slot, an arc depth value of an arc portion formed between two of the adjacent magnet-receiving slots and caved from the outer edge of the rotor toward the axis of the rotor is designed, so as to minimize the torque ripple in the maximum output torque range. Thus, the mutual influence of the leak flux of motor and the air-gap flux distribution/density is eliminated, and it achieves the effect of improving the efficiency of motor. In addition, with the motor air gap width value and the slot width value of the magnet-receiving slot, a first rib width value of a first rib disposed between the magnet-receiving slot and the arc portion, and a second rib width value of a second rib disposed between two of the adjacent magnet-receiving slots are designed, so as to avoid the demagnetization of the magnet by the flux weakening control and reduce the leak flux caused by the rotor ribs effectively. It ensures the rotor assembly to provide the better output torque performance, thereby improving the efficiency of the motor. By optimizing the size and parameters, it simplifies the design and speeds up the development of products.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotor lamination for a motor, wherein the motor has a motor air gap width value, and the rotor lamination comprises:
    a main-body portion having a center configured to be spatially corresponding to and located at a central axis of the motor;
    a plurality of edges disposed around outside of the main-body portion;
    a plurality of magnet-receiving slots configured to accommodate a plurality of magnets of the motor therein correspondingly, and disposed on the main-body portion around the central axis, wherein each of the plurality of magnet-receiving slots accommodates the magnet corresponding thereto, wherein the magnet-receiving slot has a slot width value in an outward direction extending from the central axis, and the magnet-receiving slot and the corresponding edge at outside of the main-body portion form a magnet depth value; and
    a plurality of arc portions disposed between each two of the adjacent magnet-receiving slots respectively, wherein an outer edge is defined between two of the adjacent edges, and the arc portion is caved from the outer edge corresponding thereto to have an arc depth value, wherein the arc depth value is greater than a sum value of a second rate constant multiplied by the slot width value and then subtracted the motor air gap width value, and is less than the sum value of the second rate constant multiplied by the slot width value and then plus the motor air gap width value,
    wherein the magnet depth value is greater than a sum value of a first rate constant multiplied by the slot width value and then subtracted the motor air gap width value, and is less than the sum value of the first rate constant multiplied by the slot width value and then plus the motor air gap width value, wherein the first rate constant ranges from 1.4 to 1.5.

2. The rotor lamination according to claim 1, the second rate constant ranges from 0.5 to 0.6.

3. The rotor lamination according to claim 1, further comprising a plurality of first ribs respectively disposed between the magnet-receiving slot and the arc portion corresponding thereto, wherein each of the plurality of first ribs has a first rib width value, and the first rib width value is greater than a sum value of the slot width value divided by the sum of the slot width value and the motor air gap width value and then subtracted 0.5 times of the motor air gap width value, and is less than the sum value of the slot width value divided by the sum of the slot width value and the motor air gap width value and then plus 0.25 times of the motor air gap width value.

4. The rotor lamination according to claim 3, further comprising a plurality of second ribs disposed between each two of the adjacent magnet-receiving slots respectively, wherein each of the plurality of second ribs has a second rib width value, and the second rib width value is greater than a sum value of the slot width value divided by the sum of the slot width value and the motor air gap width value and then plus 0.25 times of the motor air gap width value, and is less than the sum value of the slot width value divided by the sum of the slot width value and the motor air gap width value and then plus 1.25 times of the motor air gap width value.

5. The rotor lamination according to claim 1, wherein the number of the magnet-receiving slots and the number of the magnets are the same as 2N, wherein N is an integer and greater than or equal to 3.

6. A rotor assembly for a motor, wherein the motor has a motor air gap width value, and the rotor assembly comprises:
a plurality of magnets; and
a plurality of rotor laminations stacked along a central axis of the motor, wherein each of the plurality of rotor laminations comprises:
a main-body portion having a center spatially corresponding to and located at the central axis;
a plurality of edges disposed around outside of the main-body portion; and
a plurality of magnet-receiving slots configured to accommodate the plurality of magnets, and disposed on the main-body portion around the central axis, wherein each of the plurality of magnet-receiving slots accommodates the magnet corresponding thereto, wherein the magnet-receiving slot has a slot width value in an outward direction extending from the central axis, and the magnet-receiving slot and the corresponding edge at outside of the main-body portion form a magnet depth value,
wherein the magnet depth value is greater than a sum value of a first rate constant multiplied by the slot width value and then subtracted the motor air gap width value, and is less than the sum value of the first rate constant multiplied by the slot width value and then plus the motor air gap width value, wherein the first rate constant ranges from 1.4 to 1.5,
wherein each rotor lamination further comprises a plurality of arc portions disposed between each two of the adjacent, magnet-receiving slots respectively, wherein an outer edge is defined between two of the adjacent edges, and the arc portion is caved from the outer edge corresponding thereto to have an arc depth value, wherein the arc depth value is greater than a sum value of a second rate constant multiplied by the slot width value and then subtracted the motor air gap width value, and is less than the sum value of the second rate constant multiplied by the slot width value and then plus the motor air gap width value.

7. The rotor assembly according to claim 6, the second rate constant ranges from 0.5 to 0.6.

8. The rotor assembly according to claim 6, wherein each rotor lamination further comprises a plurality of first ribs respectively disposed between the magnet-receiving slot and the arc portion corresponding thereto, wherein each of the plurality of first ribs has a first rib width value, and the first rib width value is greater than a sum value of the slot width value divided by the sum of the slot width value and the motor air gap width value and then subtracted 0.5 times of the motor air gap width value, and is less than the sum value of the slot width value divided by the sum of the slot width value and the motor air gap width value and then plus 0.25 times of the motor air gap width value.

9. The rotor assembly according to claim 8, wherein each rotor lamination further comprising a plurality of second ribs disposed between each two of the adjacent magnet-receiving slots respectively, wherein each of the plurality of second ribs has a second rib width value, and the second rib width value is greater than a sum value of the slot width value divided by the sum of the slot width value and the motor air gap width value and then plus 0.25 times of the motor air gap width value, and is less than the sum value of the slot width value divided by the sum of the slot width value and the motor air gap width value and then plus 1.25 times of the motor air gap width value.

10. The rotor assembly according to claim 6, wherein the number of the magnet-receiving slots and the number of the magnets are the same as 2N, wherein N is an integer and greater than or equal to 3.

* * * * *